United States Patent [19]

Rütschle et al.

[11] Patent Number: 5,364,210
[45] Date of Patent: Nov. 15, 1994

[54] MACHINE TOOL

[75] Inventors: Eugen Rütschle, Mühlheim/Donau; Rudolf Haninger, Seitingen, both of Germany

[73] Assignee: Chiron-Werke GmbH & Co. KG, Tuttlingen, Germany

[21] Appl. No.: 177,283

[22] Filed: Jan. 4, 1994

[30] Foreign Application Priority Data

Feb. 27, 1993 [DE] Germany .............. 4306093

[51] Int. Cl.⁵ .............................. B23Q 11/08
[52] U.S. Cl. .................. 409/134; 29/DIG. 56; 451/452; 74/608; 408/241 G
[58] Field of Search .............. 409/134, 136; 483/69, 483/14; 29/DIG. 56, DIG. 59, 33 P; 51/274; 74/608, 613; 408/241 G; 198/346, 346.1

[56] References Cited

U.S. PATENT DOCUMENTS

| | | | |
|---|---|---|---|
| 2,443,734 | 6/1948 | Kearney et al. | 409/134 |
| 4,373,406 | 2/1983 | Piotrowski | 198/346 X |
| 4,716,647 | 1/1988 | Winkler et al. | 483/14 |
| 4,768,902 | 9/1988 | Rütschle et al. | 29/DIG. 56 X |
| 4,863,319 | 9/1989 | Winkler et al. | 409/134 |
| 4,966,505 | 10/1990 | Winkler et al. | 409/134 |
| 5,181,898 | 1/1993 | Piotrowski | 483/14 X |
| 5,265,497 | 11/1993 | Curless | 74/608 |

FOREIGN PATENT DOCUMENTS 654237 2/1986 Switzerland ................ 483/14

Primary Examiner—William Briggs
Attorney, Agent, or Firm—Pretty, Schroeder, Brueggemann & Clark

[57] ABSTRACT

A machine tool comprises a workpiece table that can rotate about a vertical axis. A first spray shielding panel is rigidly attached to the workpiece table substantially along one diameter thereof. It divides the workpiece table into a placement side and a machining side. A second spray shielding panel is stationary and is arranged above the first spray shielding panel, and runs substantially parallel thereto. An articulated third spray shielding panel connects the first and second spray shielding panel to one another. It is connected at its top in a hinged manner to the second spray shielding panel and is provided with a channel at its bottom that encloses an upper edge of the first spray shielding panel over a finite length.

8 Claims, 1 Drawing Sheet

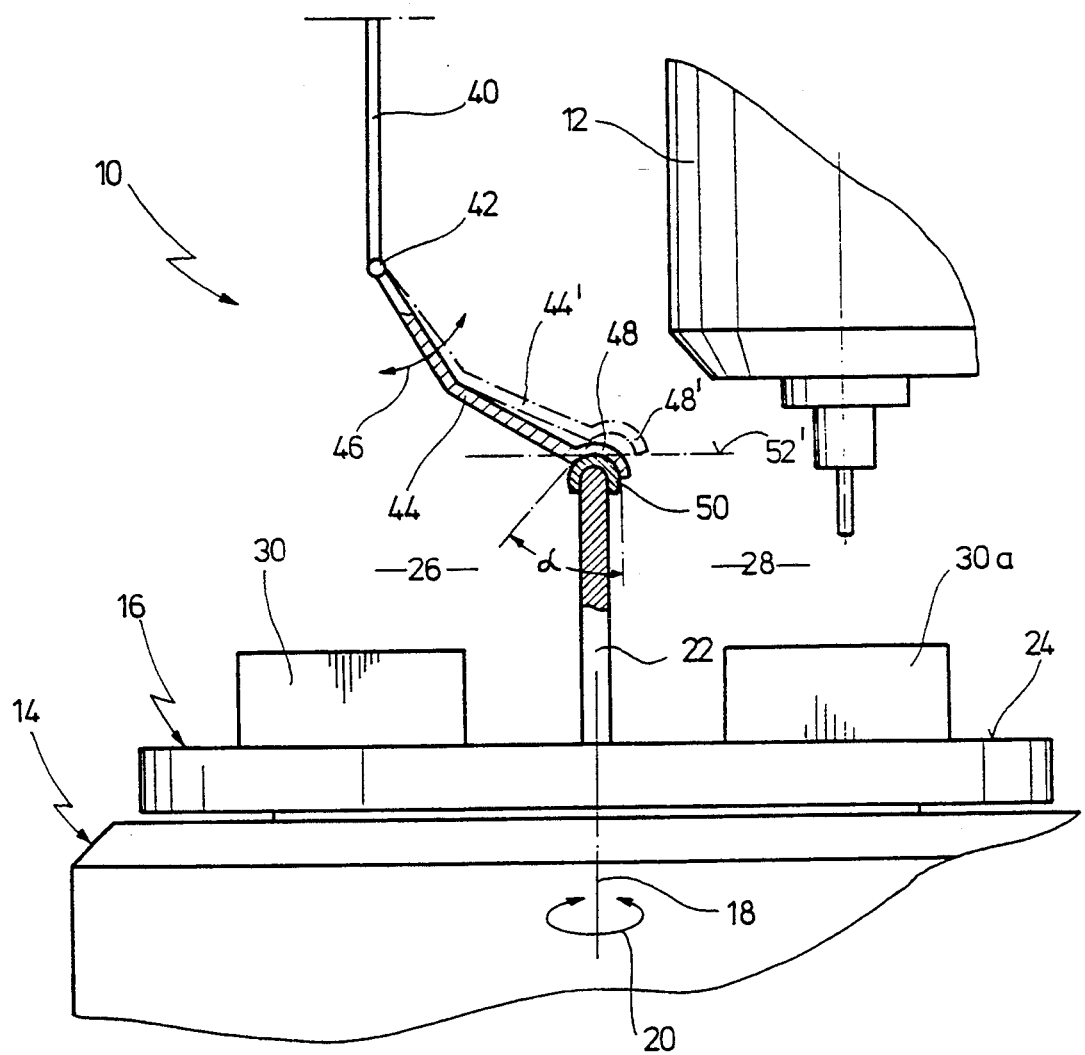

MACHINE TOOL

FIELD OF THE INVENTION

The invention concerns a machine tool with a workpiece table that can rotate about a vertical axis, which is divided, by means of a first splash protecting wall or spray shielding panel, which is fastened to the workpiece table substantially along a diameter of the workpiece table, into a placement side and a machining side. A stationary second spray shielding panel is arranged above the first spray shielding panel and runs substantially parallel to the first spray shielding panel. An articulated connecting means between the first and second spray shielding panel are provided, which grasp onto an upper edge of the first spray shielding panel.

BACKGROUND OF THE INVENTION

In a machine tool as known from U.S. Pat. No. 4,863,319, the first spray shielding panel is fastened to the workpiece table with a hinge so that it can pivot about the horizontal hinge axis. The workpiece table can be rotated 180° in either direction, so that the machining side and placement side are represented by the opposite halves of the workpiece table surface in succession. In the final rotation positions of the workpiece table the first spray shielding panel is in an inclined position, so that the space above the workpiece table is divided asymmetrically. Specifically, the space above the workpiece table is larger on the machining side so that a relatively protruding spindle head with a tool can be moved in to the diameter of the workpiece table, while the space above the workpiece table on the placement side is substantially smaller. It is sufficient, however, to allow the removal of workpieces that have just been machined, and to allow clamping of new workpieces that have not yet been machined.

In the known machine tool, in order for the first, pivotable spray shielding panel to be able to follow the rotary movement of the workpiece table, the lower edge of the second, stationary spray shielding panel is arranged above the placement side. Located in the center of this lower edge is a rotatable fork, open toward the bottom, that fits around the thickened upper edge of the first spray shielding panel on both sides.

When the workpiece table rotates, the thickened upper edge of the first spray shielding panel therefore moves vertically between the prongs of the form, while at the same time the fork is rotated about its vertical axis. During this rotary movement of the workpiece table, the fork also moves lengthwise along the upper edge of the first spray shielding panel.

On the basis of this machine tool, the underlying object of the invention is to create an arrangement with even fewer mechanical elements that is of a particularly simple configuration and guarantees particularly good sealing.

SUMMARY OF THE INVENTION

According to the invention, this object is achieved by the fact that the first spray shield is rigidly attached to the workpiece table, and that the connecting means comprise a third spray shielding panel that is connected at its top in a hinged manner to the second spray shielding panel and at its bottom rests on the upper edge, and in particular is provided with a channel that encloses the upper edge over a finite length.

The underlying object of the invention is entirely achieved in this manner.

Specifically, in the final rotation positions of the workpiece table the channel of the third spray shielding panel, which opens downward, surrounds the upper edge of the first spray shielding panel, preferably over its entire length, so that in these terminal or final positions a complete seal is produced between the machining side and placement side. Also contributing to this result is the hinge at the top of the third spray shielding panel, which in turn represents a sealed connection to the second, stationary spray shielding panel.

When the workpiece table rotates through 180°, the upper edge of the first spray shielding panel slides out of the channel, runs along its lower rim, and lastly reengages into the channel in the opposite terminal rotation position.

The machine tool according to the invention therefore has only one moving element, namely the third spray shielding panel which is suspended along a hinge. The configuration is thus extremely simple and therefore unlikely to malfunction.

In a preferred embodiment of the machine tool according to the invention, the upper edge consists of a strip of a low-friction material.

The advantage of this feature is that the first spray shielding panel can be made of any desired material, and only the upper edge needs to consist of a strip of a special material, for example a polytetrafluoroethylene. This makes it possible to minimize wear in the region of the channel and upper edge even when the workpiece table is frequently actuated.

Also preferred is an embodiment of the invention in which the second spray shielding panel is inclined.

The advantage of this feature, as already mentioned above, is that the space above the workpiece table can be divided asymmetrically, to give a protruding spindle head sufficient room for movement on the machining side.

Further advantages are evident from the description and from the attached drawings.

BRIEF DESCRIPTION OF THE DRAWINGS

An exemplary embodiment of the invention is depicted in the drawings and will be explained further in the description below. The single Figure shows a side view, partly expanded and sectioned, of an exemplary embodiment of a machine tool according to the invention.

DETAILED DESCRIPTION OF THE PREFERRED EMBODIMENT

In the Figure, 10 designates the totality of a machine tool, preferably what is called a machining center, i.e. a numerically controlled machine tool in which drilling, milling, and other operations can be performed successively on workpieces by a plurality of interchangeable tools.

In the exemplary embodiment depicted, the machine tool 10 has a vertical spindle head 12 that preferably can move along the three Cartesian spatial coordinates, as is known in the art.

A workpiece table 16, which can rotate 180° in either direction about a vertical axis 18 as indicated by an arrow 20, is located on a stationary machine bed 14. Arranged along a diameter of the workpiece table 16 and thereupon is a first splash protecting wall or spray shielding panel 22 that preferably projects vertically upward from a surface 24 of the workpiece table 16.

The first spray shielding panel 22 divides the space above the surface 24 into a placement side 26 and a machining side 28.

Workpieces 30 and 30a are arranged on the placement side 26 and machining side 28, respectively.

A second spray shielding panel 40 is arranged in a stationary manner above the workpiece table 16. It extends vertically downward from an upper frame or other end (not depicted in the Figure) of the machine covering and runs substantially parallel to the first spray shielding panel 22. It is, however, offset a certain amount toward the placement side 26 as compared to the first spray shielding panel 22.

A hingelike joint 42, with which a third spray shielding panel 44 is articulated onto the second spray shielding panel 40, is located at the bottom of the second spray shielding panel 40. The third spray shielding panel 44 can therefore pivot with respect to the second spray shielding panel 40, as indicated by an arrow 46 and by the positions 44, 44' of the third spray shielding panel. For example, the third spray shielding panel 44 can extend at a slight offset, and at its lower end preferably flares out into a channel 48 that runs parallel to the hinge 42.

The channel 48 fits around a strip 50 that is placed on top of the first spray shielding panel 22. The strip 50 has an upper edge that, in the position shown with solid lines in the Figure, extends perpendicular to the plane of the drawing, while when the workpiece table 16 is in a position pivoted through 90°, it lies in the plane of the drawing and is there labeled 52'. The strip 50 is preferably made of a material with low-friction characteristics, especially a plastic, preferably polytetrafluoroethylene.

The channel 48 is dimensioned so that its opening angle α is sufficiently large, i.e. so that it covers the strip 50, which is preferably semicylindrical in shape, with a circumferential angle of much less than 180°.

However, the third spray shielding panel 44 can also be designed without a channel 48, and in that case rests tangentially on the upper edge of the first spray shielding panel 22. In this case a projecting slide rail is applied at the bottom of the free end of the third spray shielding panel 44, and slides, for example, along the strip 50 when the workpiece table 16 pivots.

The arrangement operates as follows:

In the terminal position of the workpiece table 16 depicted in the Figure with solid lines, the channel 48 of the third spray shielding panel 44 rests non-positively on the strip 50. Complete spray shielding thus exists between the machining side 28 and the placement side 26, since the scattered chips of material and sprayed lubricant that are produced as the workpiece 30a is machined run down the spray shielding panels 40, 44, 22, and cannot pass through to the placement side 26. On the placement side 26, the previously machined workpiece can thus be removed and a new, as yet unmachined workpiece 30 can be clamped in place.

When the workpiece table 16 is then pivoted through an angle of 180° about its axis 18 once the machining process on the workpiece 30a is complete, the strip 50 disengages from the channel 48, since the channel 48 does not rest on the strip 50 so as to produce a fixed, positive connection. The third spray shielding panel 44 rises because the top edge of the strip 50 slips out of the channel 48 and slides along its lower edge. When the workpiece table 16 has pivoted through 90°, i.e. half its rotation path, the channel 48' of the third spray shielding panel 44 is in its highest position, as depicted in the Figure with dot-dash lines. As the rotary motion of the workpiece table 16 then continues, the strip 50 reengages in the channel 48' and 48.

Since the third spray shielding panel 44 is inclined, the working space above the machining side 28 is larger than the working space above the placement side 26. As is clearly evident from the Figure, this allows the spindle head 12 to be moved all the way to the axis of symmetry of the workpiece table 16, since the protruding parts of the spindle head 12 can then project over the placement side 26.

It is understood that the features mentioned above can be used not only in the respective combinations indicated, but also in other combinations or in isolation, without leaving the scope of the present invention, which is accordingly given only by the following claims:

We claim:

1. Machine tool, comprising:
   a workpiece table means having a diameter and an upper surface, which workpiece table means is rotatable about a vertical axis,
   a first splash protecting wall means rigidly attached to said workpiece table means and oriented substantially along said diameter of said workpiece table means, whereby said upper surface of said workpiece table means is divided into a placement region for receiving fresh workpieces to be machined next and into a machining region for receiving workpieces to be machined first, such that said first splash protecting wall means shields said placement area against particles originating from said machining area,
   a stationary second splash protecting wall means fixed to a part of the machine tool and arranged above of said first splash protecting wall means, such that it runs substantially parallel to said first splash protecting wall means, and
   an articulated third splash protecting wall means between said first and second splash protecting wall means, said third splash protecting wall means being connected at its top portion in a hinged manner to said second splash protecting wall means and resting at its bottom portion loosely on an upper edge portion of said first splash protecting wall means, such that said third splash protecting wall means can pivot with respect to said second splash protecting wall means while grasping onto said upper edge portion of said first splash protecting wall means.

2. Machine tool according to claim 1, characterized in that said bottom portion of said third splash protecting wall means is provided with a channel means enclosing the upper edge portion of said first splash protecting wall means over a finite length.

3. Machine tool according to claim 1, characterized in that said upper edge portion of said first splash protecting wall means comprises a strip of a low-friction material.

4. Machine tool according to claim 2, characterized in that said upper edge portion of said first splash protecting wall means comprises a strip of a low-friction material.

5. Machine tool according to claim 1, characterized in that said second splash protecting wall means is inclined with respect to said vertical axis.

6. Machine tool according to claim 2, characterized in that said second splash protecting wall means is inclined with respect to said vertical axis.

7. Machine tool according to claim 3, characterized in that said second splash protecting wall means is inclined with respect to said vertical axis.

8. Machine tool according to claim 4, characterized in that said second splash protecting wall means is inclined with respect to said vertical axis.

* * * * *